United States Patent Office 3,437,162
Patented Apr. 8, 1969

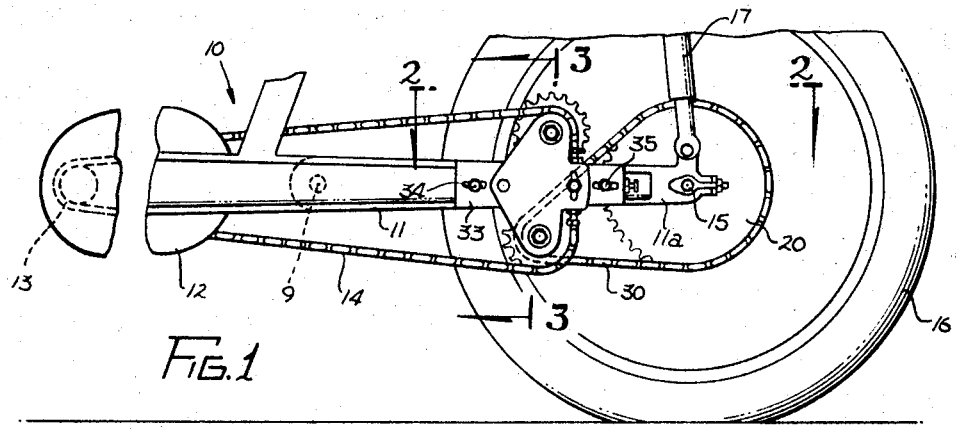
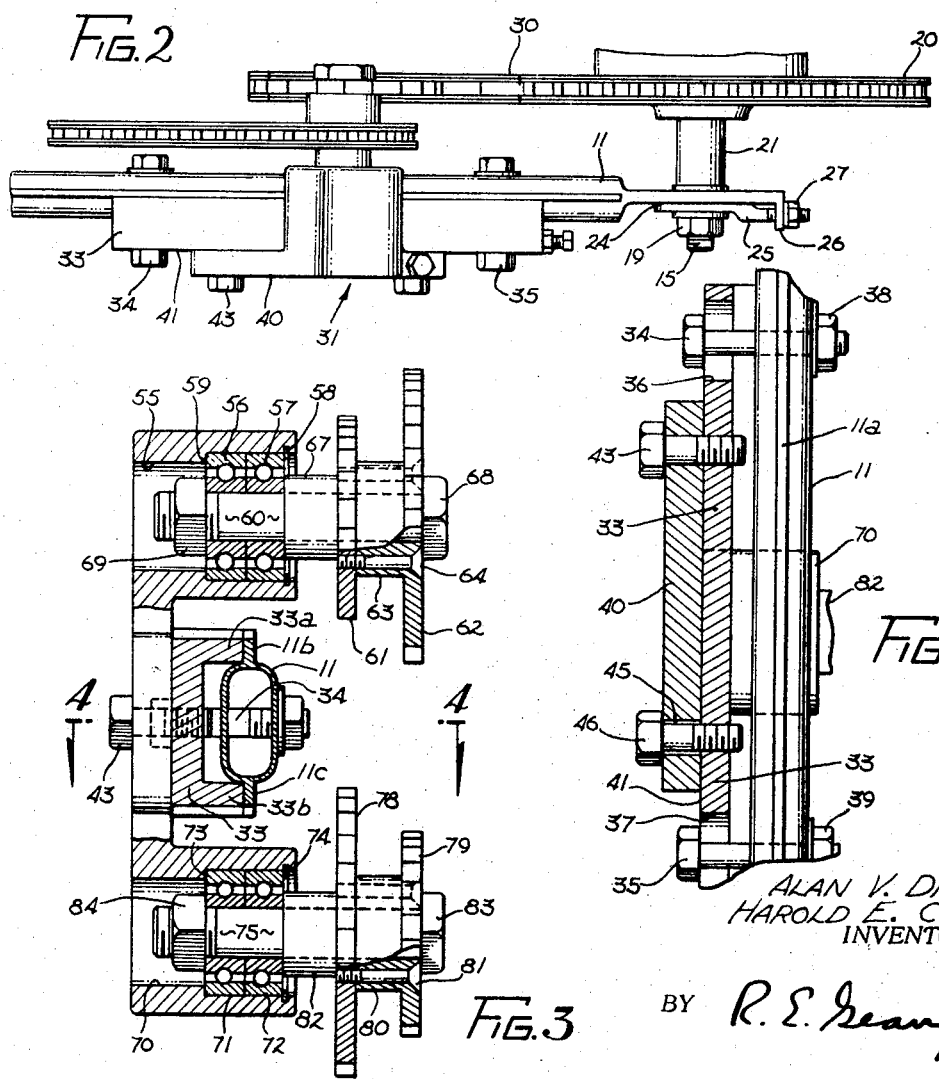

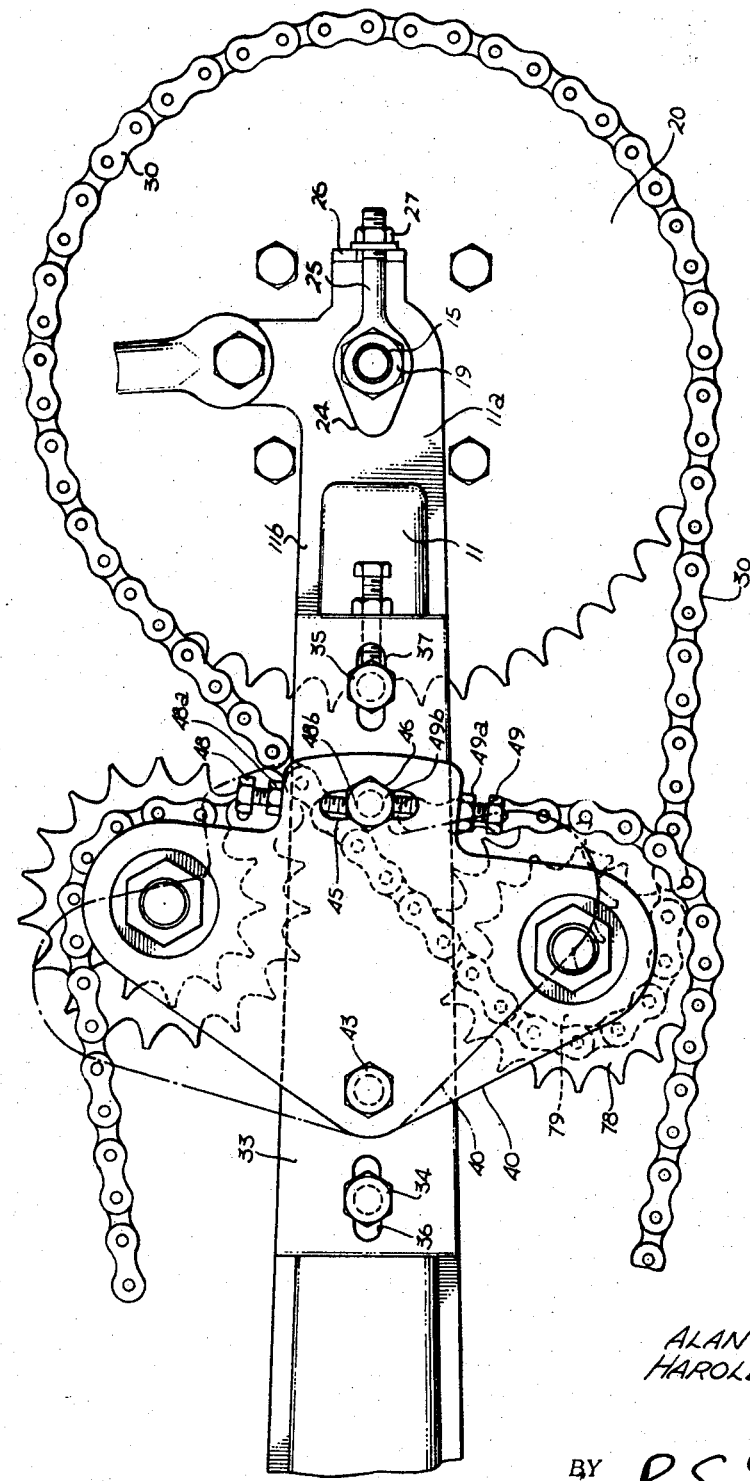

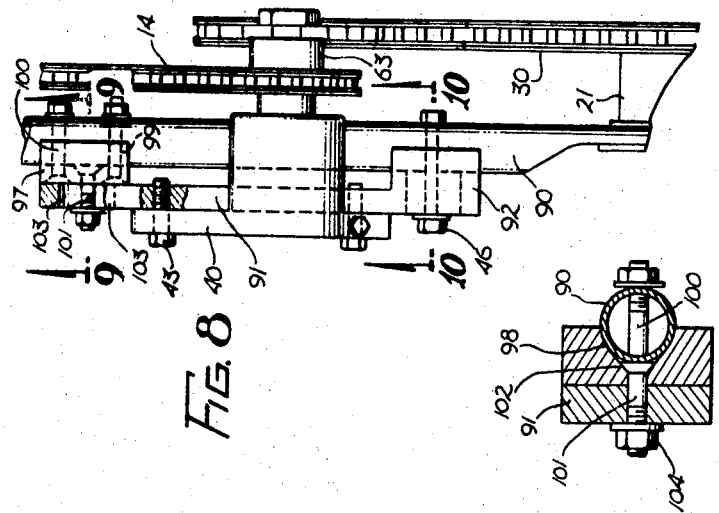
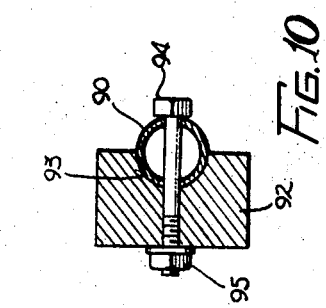
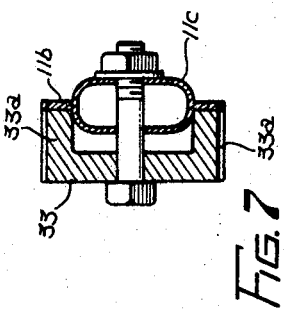
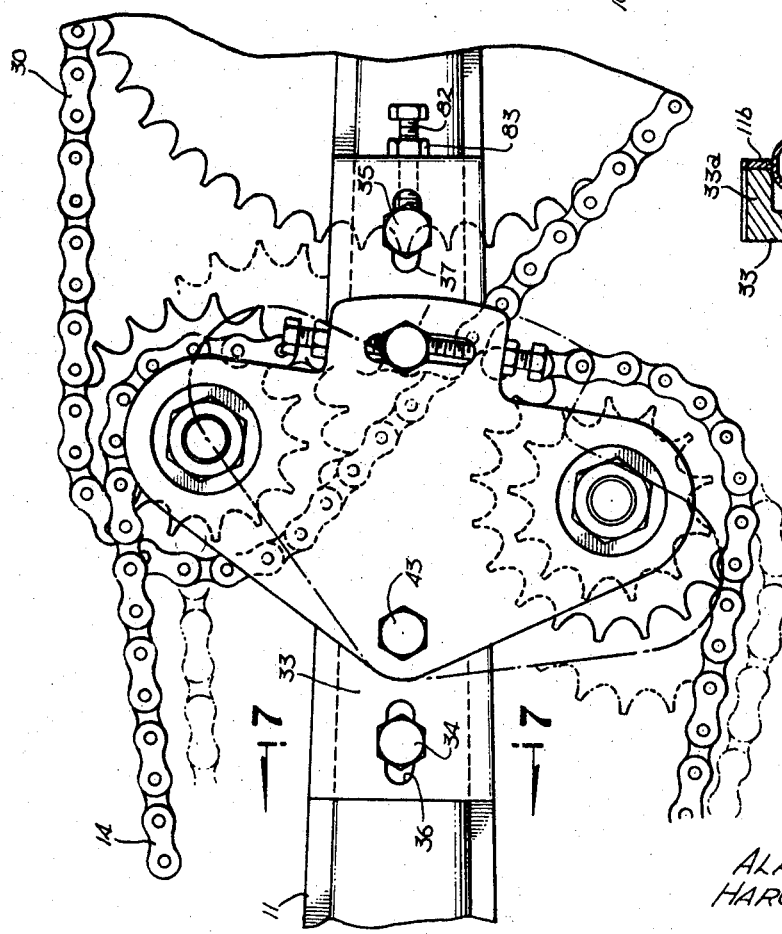
ALAN V. DIEHL
HAROLD E. COLE
INVENTOR.

3,437,162
DUAL RATIO SPROCKET ASSEMBLY
FOR MOTORCYCLES
Alan V. Diehl, 11144 Wystone Ave., Northridge, Calif.
91324, and Harold E. Cole, Northridge, Calif.; said
Cole assignor to said Diehl
Filed Sept. 7, 1967, Ser. No. 666,046
Int. Cl. B60k 17/06; F16h 9/24, 11/00
U.S. Cl. 180—33                                 11 Claims

ABSTRACT OF THE DISCLOSURE

The dual ratio sprocket assembly has a pivoted bearing plate which rotatably supports upper and lower shafts, each of which carries two spaced sprockets. A first set of driven sprockets consists of a sprocket on each shaft located in the same plane and driven by the transmission through a primary chain. A second set of drive sprockets consists of a second sprocket on each shaft located in a second plane, one of which is connected to the sprocket on the rear wheel through a secondary chain. The bearing plate can be pivoted to change the secondary chain from one drive sprocket of the second set to the other sprocket of the second set.

---

This invention relates to a dual ratio sprocket assembly for motorcycles, and more particularly, to a dual ratio sprocket assembly which can be quickly changed from one drive ratio to another.

Motorcycles are used both for street riding and for trail riding and it is desirable to have a lower gear ratio to the rear wheel for trail riding to obtain greater torque on the rear wheel and slower speed. Some motor bikes or motorcycles have dual sprockets of different sizes on the rear wheel and an extra piece of chain is provided for insertion into the drive chain when the larger sprocket on the rear wheel is to be utilized for trail riding. In order to change from the smaller to the larger sprocket, a master link in the drive chain must be removed and the extra length of chain added. Also, the larger sprocket on the rear wheel when used with the longer chain, has to be moved over into alignment with the transmission driven gear at the other end of the drive chain. The addition of an extra length of chain into the drive chain and the moving of the sprocket for the rear wheel takes considerable time and requires considerable mechanical ability. Some motor bikes have a complicated type of gear shift which is operated by a lever and of course, such gear shift systems are very expensive.

The present invention provides a dual ratio sprocket assembly which can be quickly converted from the street ratio to the trail ratio without extensive mechanical changes. Basically, the device utilizes a bearing plate which is mounted on the frame of the cycle intermediate between the transmission and the rear wheel. The bearing plate has two shafts vertically displaced from one another and each shaft carries two sprockets located side by side. A first set of two driven sprockets consists of a sprocket on each shaft located in a first plane and a second set of drive sprockets consists of the other sprocket on each shaft located in a second plane. A first primary drive chain passes around the first set of sprockets and around the gear driven by the engine transmission in order to continually rotate the first set of driven sprockets. A second secondary chain passes around only one of the driven sprockets of the second set and around an offset sprocket on the rear wheel which is in alignment with the plane of the second set of sprockets. One sprocket of the second set drives the rear wheel at the street ratio and the other sprocket drives the rear wheel at the trail ratio.

The bearing plate is pivotally mounted to the bike frame by means of a suitable fitting and the frame can be pivoted in one direction or the other to remove the secondary chain from one of the sprockets of the second set and then place it on the other sprocket of the second set without substantially affecting the tension of the primary drive chain passing around the first set of sprockets. After the chain has been switched from one sprocket of the second set to the other, the bearing plate is then securely fastened in order to maintain the suitable tension in the secondary chain.

The dual sprocket assembly is compact enough to be attached to the frame forward of the rear wheel without extensive modification, and it is not necessary to insert additional lengths of chain in either of the first (primary) or second (secondary) drive chains in order to change the drive ratio from street ratio to trail ratio. Also, since both drive sprockets of the second set are in alignment with the sprocket on the rear wheel, the changing of the secondary chain from one sprocket to another of the second set will not cause misalignment between the drive sprocket and the rear wheel sprocket.

It is therefore an object of the present invention to provide a dual ratio sprocket assembly for motorcycles and other vehicles which utilizes two separate sets of sprockets in separate side-by-side planes with both sprockets of one set being driven by the vehicle engine and one or the other of the sprockets of the second set driving the rear wheel sprocket at the desired ratio.

Another object of the present invention is to provide a dual ratio sprocket assembly which can be easily changed from one ratio to another ratio by simply rocking the assembly to permit removal of the chain from one drive sprocket and thereafter attachment of the chain to another driven sprocket.

Another object of the present invention is to provide a dual ratio sprocket assembly for motorcycles in which the chain can be changed from one drive sprocket to another without misalignment between the drive sprocket and the sprocket on the rear wheel.

A further object of the invention is to provide a dual ratio sprocket assembly for motorcycles which is easy to install on existing motor bikes, economical to produce and rugged enough to withstand abuse on a cycle used on the trail or for hill climbing.

These and other objects of the invention not specifically set forth above will become readily apparent from the accompanying description and drawings in which:

FIGURE 1 is a side elevational view of the dual ratio sprocket assembly of the present invention showing the secondary drive chain in the climbing or trail ratio;

FIGURE 2 is the transverse section along line 2—2 of FIGURE 1 showing the bearing plate which mounts the shafts for the two sets of sprockets;

FIGURE 3 is a vertical section along line 3—3 of FIGURE 1 showing the two shafts mounted by the bearing plate;

FIGURE 4 is a transverse section along line 4—4 of FIGURE 3 showing the attachment of the bearing plate to the vehicle frame;

FIGURE 5 is an enlarged side elevational view similar to FIGURE 1 showing the secondary chain in position to produce the trail ratio;

FIGURE 6 is a side elevational view similar to FIGURE 1 showing the manner in which the bearing plate can be rotated to change the drive ratio;

FIGURE 7 is a vertical section along line 7—7 of FIGURE 6 showing the attachment for mounting the bearing plate;

FIGURE 8 is a modified attachment for mounting the bearing plate on a tubular vehicle frame;

FIGURE 9 is a vertical section along line 9—9 of FIGURE 8; and

FIGURE 10 is a vertical section along line 10—10 of FIGURE 8.

Referring to the embodiment of the invention chosen for purposes of illustration, FIGURE 1 illustrates a portion of a motorcycle 10 having a swinging fork member 11 pivoted at point 9 and a transmission 12 supported by the stationary frame of the motorcycle. The output gear 13 of the transmission meshes with and drives the first primary drive chain 14. The fork 11 extends rearwardly and supports axle 15 of the rear wheel 16 at its two ends 11a. Each end 11a is also connected with a vertical member 17 which serves as a spring and shock absorber for the vehicle frame. The transmission 12 will be driven by the vehicle engine which is supported above the transmission on the vehicle frame in any well known manner. A rear wheel sprocket 20 is attached to the hub 21 of the rear wheel and the axle 15 is attached to each yoke member by a nut 19. A standard collar 24 is located around axle 15 and has a shaft 25 extending through a flange 26 on a yoke end 11a so that nut 27 on shaft 25 can adjust the position of axle 15. A secondary chain 30 meshes with the rear wheel sprocket 20 in order to rotate the wheel 16 of the vehicle.

The primary chain 14 and the secondary chain 30 both connect with a sprocket assembly 31 which is attached by mounting bracket 33 to one of the frame members 11 by means of bolts 34 and 35 which pass through slotted openings 36 and 37, respectively, in the mounting frame 33. The bolts 34 and 35 also pass through the frame member 11 and are secured by means of nuts 38 and 39, respectively, located on the inside of the frame member 11 (see FIGURE 4). The bracket 33 is U-shaped and has legs 33a and 33b held against edge flanges 11b and 11c, respectively, of frame member 11 (see FIGURE 3). A bearing mounting plate 40 is pivotally mounted adjacent the surface 41 of the mounting bracket 33 by means of a pivot bolt 43 which passes through the mounting plate and is threaded into the mounting member 33. The side of plate 40 opposite the bolt 43 contains an arcuate slot 45 through which passes a bolt 46 and this bolt can be tightened into the mounting plate 33 in order to hold the bearing plate 40 in any desired angular position about pivot bolt 43. A positioning screw 48 passes through the upper edge of the bearing plate 40 into position with its end 48b opposite the bolt 46, and a lower positioning bolt 49 passes through the lower edge of the plate 40 into position with its end 49b opposite the other side of the bolt 46. The bolts 48 and 49 have lock nuts 48a and 49a, respectively, both are preset by lock nuts to provide a gap between the ends of the bolts slightly greater than the diameter of bolt 46.

The top of the bearing plate 40 comprises a first bearing housing 55 containing two bearings 56 and 57 which are held by a retaining ring 58 against the ledges 59 of the housing. A shaft 60 is supported by the bearings 56 and 57 and the shaft carries a pair of sprockets 61 and 62. The sprockets are separated by a spacer 63 which is integral with the sprocket 62, and screws 64 pass through the sprocket 62 into the sprocket 61 in order to attach the two sprockets together so that they will rotate together on the shaft 60. A spacer 67 is located between the bearing 57 and the sprocket 61 and the head of the shaft 60 is drawn against sprocket 62 by means of a nut 69 threaded on the end of the shaft 60. The bearing plate 40 also has a second, lower bearing housing 70 containing bearings 71 and 72 which are held in position against a ledge 73 by means of a retainer ring 74. A shaft 75 is supported by the bearings and also carries a pair of sprockets 78 and 79. The sprocket 79 has a spacer 80 through which passes screws 81 in order to secure the two sprockets together for rotation together. A spacer 82 is located between bearing 72 and sprocket 78 and the head 83 on shaft 75 is drawn against the sprocket 79 by means of nut 84 on the end of the shaft. The spacers for the upper and lower sprockets are identical in width so that the sprockets 61 and 78 are in the same plane and comprise a first set (or pair) of driven sprockets while the sprockets 62 and 79 are in a second plane spaced from the first plane and comprise a second set (or pair) of drive sprockets. The primary chain 14 driven by the transmission gear 13 passes around the driven sprockets 61 and 78 comprising a first set (or pair) and thereby continually rotate the drive sprockets 62 and 79 comprising the second set (or pair). In the event that bearings are placed between the spacers 63 and 80 and the shafts 60 and 75, respectively, then the shafts can be fixed to the plate 40 since it is only necessary that the two sprockets adjacent each spacer are fixed together at the spacer and rotate together. In such a construction, the spacers 63 and 80 become the shafts for the sprockets, which shafts are rotatably supported by the mounting plate.

Referring to FIGURES 1 and 5, the secondary chain 30 is in mesh with the lower drive sprocket 79 of the second sprocket set in order to produce the trail or climbing ratio. As illustrated in FIGURE 2, the sprocket 20 for the rear wheel has been offset from the plane of the primary chain 14 by an amount equal to the spacing between the two sets of sprockets and this offset is required in order to keep the rear wheel sprocket 20 in line with the second set of sprockets which are the drive sprockets for the rear wheel. Referring to FIGURE 6, the secondary chain 30 is shown passing around the larger sprocket 62 on the shaft 60 in order to produce the street ratio by stepping up the ratios between the transmission gear 13 and rear wheel sprocket 20.

In order to change from trail to street ratio, the pivot bolt 43 is loosened and the bolt 46 is removed so that the bearing plate 40 is free to move in either up or down direction. Referring to FIGURE 5, plate 40 would be first tipped in the counterclockwise direction into the dotted line position in order to place slack in the chain 30 and permit its removal from the drive sprocket 79. Thereafter, plate 40 would be rotated about the pivot 43 in the clockwise direction into the dotted line position of FIGURE 6 to move the upper drive sprocket 62 close enough to the rear wheel sprocket 20 in order to permit the chain 30 to pass around the sprocket 62. Thereafter, the bearing plate is moved to the drive position illustrated in full line in FIGURE 6 wherein the plate 40 is rotated slightly more clockwise than it is in FIGURE 5. The bolt 46 is then inserted in groove 45 against one of the positioning bolts 48 or 49 and locked in order to hold the bearing plate in position. It is understood that the reverse procedure would be followed when changing from street to trail ratio. In other words, the bearing plate would first be tilted in a direction to remove secondary chain from drive sprocket 62 and then tilted in a direction to attach the chain to sprocket 79.

As illustrated by the full and dotted line positions of chain 14 in FIGURE 6, the rotation of the bearing plate 40 does not substantially effect the tension in the primary chain 14 since the plate is located substantially in the vertical longitudinal plane of the motorcycle. As noted in FIGURES 5 and 6, the outside circumference of driven sprockets 61 and 78 nearest to the rear wheel lie in substantially a vertical line since the center of the larger sprocket 78 is displaced to the left of the center of the smaller sprocket 61. By lining up the shafts 60 and 75 in this way when the bearing plate is in position to drive at either ratio, the spacing of the sprockets 61 and 78 is such that they are off-center approximately equal amounts in opposite directions from the vertical so that in either drive position, the amount of slack in primary chain 14 is kept about the same. The torque of the drive sprocket 79 upon the chain 30 forces the positioning screw 48 against the screw 46 and prevents the chain 30 from excessive slackening. When the chain 30 is driven by sprocket 62, the torque of the drive sprocket on the chain forces positioning screw 49 against screw 46 to prevent the chain 30 from excessive slackening. The slack in second chain 30 can be adjusted by the nut 27 acting against the axle 15. Also, the slack in primary chain 14 can be adjusted by bolt 82 which is inserted through the end of bracket 33 and is held in selected position against bolt 35 by lock nut 83.

A modified form of the mounting for bearing plate 40 is illustrated in FIGURES 8 through 10 wherein the motorcycle has a tubular swinging fork member 90 extending rearward to the rear wheel axle. The bearing plate 40 is attached to a bracket 91 having an enlarged end 92 which has a semicircle cutout 93 on one side in order to receive the yoke member 90. A bolt 94 passes througnh the end 92 and the tubular yoke member 90 and is secured by the nut 95. A block 97 at the other end of arm 91 has a circular cutout 98 for receiving yoke member 90 and two bolts 99 and 100 extend through the block and through yoke member 90 and are secured by nuts on the end of the bolt. An intermediate bolt 101 extends oppositely from the bolts 99 and 100 and has its head 102 in a cutout above the member 90. The bolt 101 projects through slot opening 103 in the bracket 91 and is secured by means of a nut 104. The bearing plate 40 is secured to the bracket 91 by means of the pivot bolt 43 and the bolt 46 as in the prior embodiment. It is therefore apparent that the mounting plates 40 can be attached to yokes of different constructions and supported on the motorcycle by various types of fittings.

It is understood that the dual ratios from the transmission gear 13 to the rear wheel sprocket 20 can be set at any desired ratios by simply selecting the size of the sprockets in the sprocket assembly 31. With the various sprocket sizes illustrated, it is apparent that the smaller sprocket 61 of the first set of sprockets will rotate the shaft 60 at a higher speed ratio with the shaft of gear 13 than obtained by the shaft 75 when rotated by the larger gear 78. In addition, the higher speed of shaft 60 will be transmitted to the rear wheel sprocket at a higher speed ratio by larger sprocket 62 than the speed ratio which will result from slower shaft 75 driving the smaller gear 79. Thus, the sizes of the gears on shaft 60 are selected for the street ratio and the sizes of the gears in the shaft 75 are selected for trail ratio. The size of the rear wheel sprocket can be a compromise between the street and trail ratios so that the sprockets on shaft 60 increase the rear wheel speed and the sprockets on shaft 75 decrease the rear wheel speed with respect to the transmission gear. In the event that the rear wheel sprocket 20 is sized for street speed, then the two sprockets on shaft 60 could be of the same size and the two sprockets on shaft 75 would provide the speed reduction required for trail use.

The present invention provides a dual ratio sprocket assembly for motorcycles which permits easy change from street ratio to trail ratio drive and vice versa. It is only necessary to loosen the bearing plate bolt 43 and remove bolt 46 in order to pivot the bearing plate and change the secondary chain 30 from one driving sprocket to another driving sprocket. Various types of mountings can be utilized to attach the sprocket assembly to the frame of the motorcycle. In the event that the driven gears 61 and 78 are substantially different in size, the pivot bolt 43 could be in a curved keyway so that the bolt can move toward and away from the transmission as the angle of the bearing plate changes in order to maintain proper tension in the primary chain 14. As previously indicated, the sizes of the various sprockets can be varied to produce the desired ratios for the different cycle sizes.

What is claimed is:

1. A dual ratio sprocket assembly for a motorcycle having a transmission gear and a rear wheel sprocket comprising:
   a mounting plate supported by the frame of said motorcycle;
   a plurality of shafts rotatably mounted on said plate;
   a plurality of driven and driving sprockets mounted on said shafts;
   a primary chain for connecting said gear with a driven sprocket on each shaft for rotating each of said shafts;
   a secondary chain connecting a driving sprocket on one of said shafts with said rear wheel sprocket; and
   means for mounting said plate on said frame for movement relative to said rear wheel sprocket to permit changing of said secondary chain from one driving sprocket to another driving sprocket.

2. A dual sprocket assembly as defined in claim 1 wherein:
   said plurality of shafts comprise first and second shafts rotatably mounted on said plate;
   said plurality of sprockets comprising a pair of driven sprockets and a pair of driving sprockets; and
   said first shaft mounting one driven and one driving sprocket and second shaft mounting the other driven and the other driving sprocket.

3. A dual ratio sprocket assembly as defined in claim 2 wherein said pair of driving sprockets are located in the same plane as said sprocket for said rear wheel.

4. A dual ratio sprocket assembly as defined in claim 2 wherein said pair of driven sprockets are located in the same plane as said transmission gear.

5. A dual ratio sprocket assembly as defined in claim 2 wherein said mounting means for said mounting plate comprises a pivot pin extending through said plate and connected with said frame.

6. A dual ratio sprocket assembly as defined in claim 5 wherein said plate lies substantially in the longitudinal, vertical plane of said motorcycle, said first shaft being located above said pivot pin and said second shaft being located below said pivot pin.

7. A dual ratio sprocket assembly as defined in claim 6 having means for holding said mounting plate in any desired angular position in order to resist the force developed on said plate by said secondary chain.

8. A dual ratio sprocket assembly as defined in claim 5 wherein:
   said holding means comprises a holding bolt passing through an arcuate slot in said mounting plate and attached to said frame; and
   a pair of positioning bolts located in said plate on opposite sides of said holding bolt and transversely of said holding bolt in order for one or the other of said positioning bolts to abut said holding bolt and assist in holding said plate in selected position.

9. A dual ratio sprocket assembly as defined in claim 2 wherein:
   one sprocket of said driven pair located on one of said shafts is smaller than the other sprocket of said driven pair located on the other of said shafts; and
   one sprocket of said driving pair located on one of said shafts being larger than the other sprocket of said driving pair located on the other of said shafts.

10. A dual ratio sprocket assembly as defined in claim 6 wherein said first shaft and second shaft are offset from a vertical transverse plane in opposite directions in order to place the outer circumferential edge of said driven sprockets in a substantially vertical line to maintain the tension on said primary chain substantially constant in the various angular positions of said mounting plate.

11. A dual ratio sprocket assembly as defined in claim 8 wherein said rear wheel sprocket is sized to produce a drive ratio with said transmission gear intermediate between street and trail ratio, the sprockets on one of said shafts stepping up the drive ratio to produce a street ratio and the sprockets on the other of said shafts stepping down the ratio to produce the trail ratio.

References Cited

UNITED STATES PATENTS 3,318,408  5/1967  Hopkins _____ 180—33

FOREIGN PATENTS 665,384  5/1929  France.
163,751  8/1933  Switzerland.
968,750  5/1950  France.

KENNETH H. BETTS, *Primary Examiner.*

U.S. Cl. X.R.

74—217; 280—236